Patented Sept. 15, 1925.

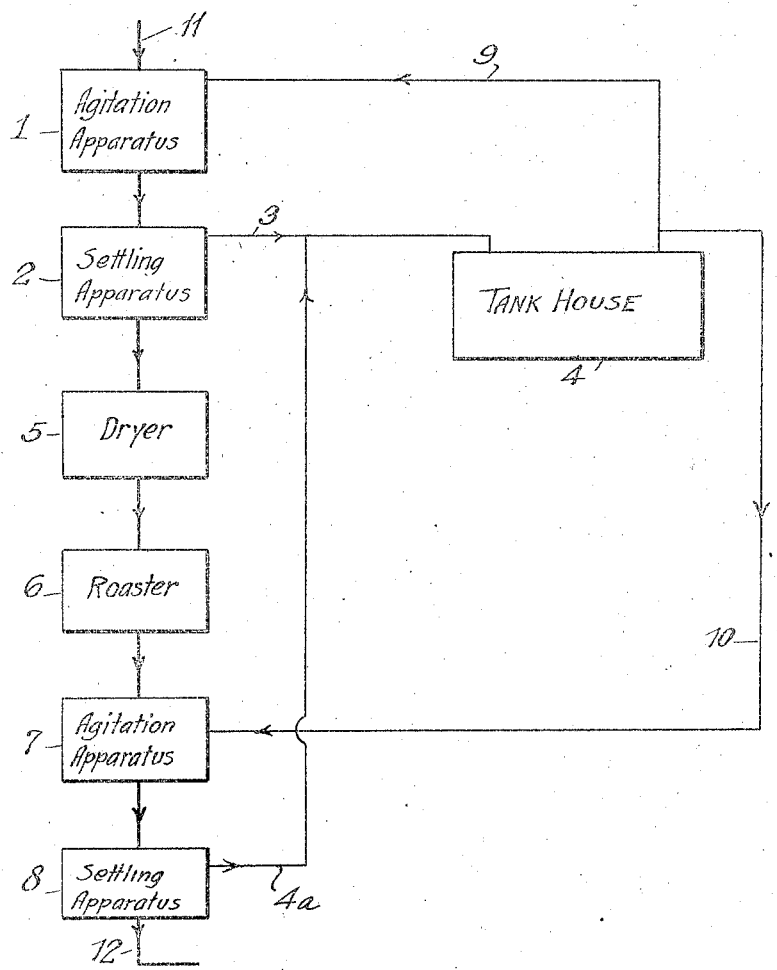

1,553,413

UNITED STATES PATENT OFFICE.

GEORGE D. VAN ARSDALE, OF LOS ANGELES, CALIFORNIA, ASSIGNOR TO INSPIRATION CONSOLIDATED COPPER COMPANY, OF NEW YORK, N. Y., A CORPORATION OF MAINE.

METHOD OF TREATING CONCENTRATES.

Application filed May 18, 1923. Serial No. 639,968.

To all whom it may concern:

Be it known that I, GEORGE D. VAN ARSDALE, a citizen of the United States, residing at Los Angeles, in the county of Los Angeles and State of California, have invented new and useful Improvements in Methods of Treating Concentrates, of which the following is a specification.

My present invention relates to a method of treating concentrates to effect a comparatively complete and economical recovery of copper therefrom.

It is well known to those skilled in the art that, in the treatment of certain ores or concentrates containing compounds of copper, a preliminary roasting may serve a useful purpose, the roasted product then containing an increased relative quantity of so-called "oxidized" copper, suitable to be subsequently subjected to extraction or leaching in an acid solution, and electrolysis being thereafter employed for the deposition of copper and the simultaneous regeneration of the leach liquor.

I have, however, ascertained that the effect of a preliminary roasting of the character referred to is, in some cases, unfavorable to a prompt and completely successful subsequent leaching of the roasted concentrates; and that surprising advantages may result from the alternative course hereinafter described, a prominent point of novelty in my preferred process being the employment of a roasting step subsequently to a leach step whenever the values retained after a leaching of the concentrates are found to warrant this course,—the deferred roasting being then followed by a subsequent leaching. That is to say, I have discovered that, while the initial roasting of certain concentrates, which may contain, for example, bornite or chalcocite or chalcopyrite, may yield a calcine whose extraction is very incomplete, the employment of an initial leaching, followed by what I have termed a deferred roasting may yield a calcine from which a nearly complete subsequent extraction is possible.

For example, in the execution of my process I may proceed by agitating a batch of concentrates in which the copper values may be in the form of sulfids with a solution containing about 5% of free sulfuric acid and as much as 1% of iron in the form of ferric sulfate, copper being thereby converted into the form of a sulfate, which may be present in quantities up to about 4%, by familiar reactions, of which the following may serve as an example:

$$CuS + Fe_2(SO_4)_3 = CuSO_4 + 2FeSO_4 + S$$

Successive portions of the leach liquor referred to may be employed upon the countercurrent principle, and an application of heat, especially toward the end of the extraction, may be sometimes economically justified, the necessity for heat depending both upon the percentage of ferric iron present and upon the solubility of the particular copper compounds present,—chalcopyrite, for example, requiring more elevation of temperature than does chalcocite, and this initial extraction being often insufficient for a satisfactorily complete recovery of values.

The residue being then separated, by filtration or otherwise, from the leach liquor, I may roast the residue without risk of detrimental effects referred to above, the leached concentrates being thereby brought largely into an oxidized condition favorable to a very complete extraction, and this extraction may be executed in the same general manner as that already described, the resulting filtrate being optionally combined with that first obtained, and the total quantity of rich liquor being then subjected to an electrolysis or to other treatment adapted to the production of either metallic copper or a desired compound thereof.

If the soluble iron content of the concentrates undergoing treatment happens to be comparatively high, I may control the quantity of this element by any suitable means, and certain advantageous methods for this control are described in my copending application Ser. No. 639,970 filed May 18, 1923.

While the process to which the present application is directed does not necessitate the employment of the additional invention mentioned above, it is advantageous, especially when metallic copper is the end product desired, to so conduct an electrolysis as to regenerate a suitable leach liquor simultaneously with the deposition of copper, a suitable quantity of iron being oxidized, by the action of the current, from the ferrous form to the ferric form, and any necessary additions of sulfuric acid being made, as may be indicated by comparison of the acid content of the regenerated liquor with the acid requirements of the concentrates.

When the concentrates which are undergoing treatment happen to vary in reducing action on ferric iron, the relative quantity of such iron which is transformed by electrolysis from the ferrous to the ferric form may be regulated, as mentioned in my copending application referred to above by suitably proportioning the number of graphite anodes employed during electrodeposition to the number of anodes formed of lead or other material having a less efficiency in the conversion referred to, the best ratio of graphite anodes to lead anodes being determined by experiment, and depending upon the relative quantity of ferric iron which is found suitable to the leaching of the concentrates in hand, a ferric content in the leach liquor as high as 1% or more being desirable.

Although an important point of the present application is the described employment of a roasting step interposed between two leachings, I may mention herein, for the sake of completeness, certain outstanding features of the invention described in my copending application Ser. No. 639,969 filed May 18, 1923 (Case B), the mentioned inventions being capable of advantageous concurrent use in a cyclical manner,—the residual liquors from the electrolytic tanks containing ferric iron, produced by regeneration, in quantities suitable for use in the extraction of fresh batches of material.

In my last mentioned application, I have indicated the marked advantages of dry crushing certain ores to a fineness adapting them to pass a very fine mesh, such as a 1/10 inch mesh; but perhaps the most important and interesting features of the process set forth therein relate to a maintaining of the ferric iron content of my liquors at all times, throughout a cyclical process involving both leaching and electrodeposition, at a level determined by the best efficiency of such liquors when employed as leaching agents.

As pointed out in the application referred to, up to the present time, electrolysis of copper sulfate solutions carrying iron has not been found practicable when so much iron is present that the strength of ferric iron incidentally produced during electrolysis rises to a figure in the neighborhood of .3% to .5%.

In further explanation, it may be stated that solutions carrying only .3% to .5% ferric iron are inactive on some sulfid compounds of copper; and, on others, the action is slow and may even require heating. With solutions containing larger amounts of ferric iron, say from .5% to .75% or 1%, or even more, I find the solvent action is much more active and rapid, and on some ores the necessity for warming the solutions is thus obviated,—with substantial advantages, from the standpoint of economy. It will be understood from the foregoing that in the employment of ferric sulfate leaching solutions, starting with, say 1% ferric iron, complete reduction of ferric iron before electrolysis cannot be had economically from the standpoint of leaching efficiency,— although this complete reduction has heretofore been regarded as essential to good electrolytic practice.

Now I have discovered that by modifying electrolytic conditions, electrolysis can be carried on, with commercial yields of copper, in the presence of very much higher amounts of ferric iron than have heretofore been thought permissible, and even in the presence of an amount sufficiently high to give a highly active solvent percentage of ferric iron. I, therefore, prefer to utilize conjointly my respective discoveries that such solutions are highly active solvents, and that it is practicable to make them by electrolysis; and, to do this, I prefer to leach the ore in such manner as not to obtain a complete reduction of the ferric iron present, aiming rather to so proportion ore and solvent that a very complete extraction shall take place while the per cent of ferric iron present is still high enough to act vigorously. This point will, of course, vary with different ores and conditions; but, in general, I have found it not necessary to reduce ferric iron below about .2%, and, in some cases, not below .5%. Generally speaking, on most ores, a maximum strength of 1% of ferric iron is sufficient; but higher percentages may be used, if necessary. A preferred method by which high percentages of ferric iron may be made by electrolysis is referred to subsequently herein.

As indicated above, a very important practical feature of my invention is the method of electrolysis by which I may produce or regenerate larger amounts of ferric iron than have hitherto been thought possible at any reasonable cathode efficiency. The presence of ferric iron during electrolysis of copper solutions has been considered highly objectionable, and objectionable in proportion to the amount of ferric iron present. This view has apparently been due to an appreciation of the fact that ferric iron is an efficient solvent for metallic copper; and unless means are taken to counteract the mentioned tendency to solution, the cathode efficiency is correspondingly reduced. Statements are found in the literature to the effect that at about .5% of ferric iron, deposition efficiency becomes very low; and, as a practical proposition, at one large installation using electrolysis, maximum ferric iron is preferably held at about .4%.

Contrary to the prevalent opinion, I have, however, found that commercial yields of copper per kilowatt hour may be had with solutions beginnings at about a zero content of ferric iron and ending considerably above 1%. That is to say, within the mentioned limits, the actual percentage of ferric iron may be disregarded,—although, obviously, the overall efficiency, for a given amount of copper deposit, with a given current density, will vary with the point at which ferric iron starts in beginning electrolysis. In order, therefore, to maintain any constant deposition efficiency, the amount of copper deposited must vary inversely with the average percentage of ferric iron before and after electrolysis. For example, in an electrolysis starting with zero ferric iron and ending with 1%, about .5% copper may be plated out at an average overall efficiency of about 60%; and, starting with, say, .8% and ending with 1% ferric iron, about .15% copper may be plated out at the same efficiency, under the conditions described.

In operating with a higher average of ferric iron, therefore, the solutions have to be returned more frequently in order to leach the copper from any given quantity of ore. This is done at an expense of pumping cost, but it may nevertheless be entirely justified in view of the fact that, as stated, high ferric iron is very desirable from the standpoint of leaching efficiency.

To oxidize iron during electrodeposition of copper, I have found it advantageous to employ a current density of at least seven to eight amperes per square foot; and the current density may be raised to fifteen amperes or more per square foot, depending on the ferric iron present, with resulting commercial cathode efficiency. To obtain commercially profitable yields, as measured in terms of pounds of copper per kilowatt hour, it is important that low voltages be employed; and such voltages may be obtained by a moderate heating (say, to 110 degrees F.) in connection with which it may be advantageous to employ known means for depolarization, and also to employ as large a proportion of graphite anodes as may be consistent with the considerations indicated above.

Although what I have above described as a deferred roasting is often distinctly more advantageous than an initial roasting, it is of the highest technical interest that, in the case of certain ores whose concentrates yield liquors containing about or above 1% of ferric iron, I find it possible and economically advantageous actually to dispense with all roasting, a suitable recovery being obtainable without this expensive step.

It will be obvious that, whenever liquors representing a good recovery and suitable for use in my described novel cyclical dissolving and electrolytic process are obtainable by a mere cold extraction (or by a cold extraction followed by warm extraction,—depending on the nature of the sulfids present) this last mentioned variation of my process, which may justify a working of extensive bodies of ore that have been regarded as practically valueless, may be of the very greatest economic importance.

It will be understood that various features of my present invention may be independently used and various modifications in the process described may be made by those skilled in the art without departure from the spirit and scope of my present invention as the same is indicated in the foregoing description and in the following claims.

The single figure of the drawing is a flow sheet of the process. The agitation apparatus 1 receives the concentrates and the leach liquor, which is drawn off into the settling apparatus 2 from which it is passed through the line 3 to the tank house 4. The solids pass from the settling apparatus 2 to a dryer 5 and thence to a roaster 6. The roasted product passes to a second agitation apparatus 7 and thence to a second settling apparatus 8, whence the liquor passes through a line 4ª to the tank house. In the tank house the solution is electrolyzed and the liquor returned by the lines 9 and 10 to the two agitation apparatus 1 and 7. The heavy line 11 indicates the flow of the concentrates, which becomes the residue flowing out from the second settling apparatus through the line 12. Thus we have, first, agitation of the concentrates with a leaching solution; second, settling for recovering the copper liquor and partially treated concentrates; third, electrolysis of the copper liquor and return to the first agitation tank; fourth, drying the thickened, partially treated material; fifth, roasting such material; sixth, agitating the roasted product with a leaching solution; seventh, settling to recover the copper liquor and the thickened barren residues and passing the latter off to washing and final discharge and eighth, electrolysis of the liquor from the second settling tank and return of it to the second agitation tank.

What I claim is:

1. In the treating of concentrates to obtain copper therefrom, the procedure which comprises an initial leaching followed by a roasting and then by a further leaching.

2. In the treating of concentrates to obtain copper therefrom, the procedure which comprises an initial leaching followed by a roasting and then by a further leaching, the leach liquor in each case comprising a free acid and a ferric salt of iron.

3. In the treating of concentrates to obtain copper therefrom, the procedure which comprises an initial leaching followed by a roasting and then by a further leaching, the leach liquor in each case comprising a free acid and a ferric salt of iron and being initially employed cold and subsequently heated only when necessary.

4. In the treating of concentrates to obtain copper therefrom, the procedure which comprises an initial leaching followed by a roasting and then by a further leaching, the liquor being regenerated by a subsequent electrolysis.

5. In the treating of concentrates to obtain copper therefrom, the procedure which comprises an initial leaching followed by a roasting and then by a further leaching, the liquor being regenerated by a subsequent electrolysis employing an anode containing graphite.

6. In the treating of concentrates to obtain copper therefrom, the procedure which comprises an initial leaching followed by a roasting and then by a further leaching, the liquor being regenerated by a subsequent electrolysis employing a current density of ten or more amperes per square foot.

7. In the treating of concentrates to obtain copper therefrom, the procedure which comprises an initial leaching followed by a roasting and then by a further leaching, the liquor being regenerated by a subsequent electrolysis with an agitation and a temperature above atmospheric.

8. In the treating of concentrates to obtain copper therefrom, the procedure which comprises an initial leaching followed by a roasting and then by a further leaching, the liquor being regenerated by a subsequent electrolysis with an agitation and a temperature above atmospheric, and sufficient ferrous sulfate being present during electrolysis to act as a depolarizer.

9. In the treating of concentrates to obtain copper therefrom, the procedure which comprises an initial leaching followed by a roasting and then by a further leaching, the leach liquor in each case comprising a free acid and a ferric salt of iron and being initially employed cold and subsequently heated only when necessary and being regenerated by a subsequent electrolysis employing an anode containing graphite, a current density of ten or more amperes per square foot, agitation, and a temperature above atmospheric, there being sufficient of a ferrous salt present during electrolysis to act as a depolarizer, and the residual liquors being employed in the subsequent leaching of additional concentrates.

10. In the treating of concentrates to obtain copper therefrom, the procedure which comprises an initial leaching followed by a roasting and then by a further leaching, the ferric content of liquors being kept throughout at a level determined by efficiency of extraction.

11. In the treating of concentrates to obtain copper therefrom, the procedure which comprises an initial leaching followed by a roasting and then by a further leaching, the liquor being regenerated by a subsequent electrolysis and the ferric content thereof being kept throughout at a level determined by efficiency of extraction.

12. In the treating of concentrates to obtain copper therefrom, the procedure which comprises an initial leaching followed by a roasting and then by a further leaching, the liquor being regenerated by a subsequent electrolysis employing an anode containing graphite and the ferric content of the liquor being kept throughout at a level determined by efficiency of extraction.

In testimony whereof I have signed my name to this specification.

GEORGE D. VAN ARSDALE.